United States Patent
Bushee (10) Patent No.: US 7,240,045 B1
(45) Date of Patent: Jul. 3, 2007

(54) AUTOMATIC SYSTEM FOR CONFIGURING TO DYNAMIC DATABASE SEARCH FORMS

(75) Inventor: William J. Bushee, Sioux Falls, SD (US)

(73) Assignee: BrightPlanet Corporation, Sioux Falls, SD (US)

( * ) Notice: Subject to any disclaimer, the term of this patent is extended or adjusted under 35 U.S.C. 154(b) by 919 days.

(21) Appl. No.: 09/911,435

(22) Filed: Jul. 24, 2001

(51) Int. Cl.
G06F 17/30 (2006.01)

(52) U.S. Cl. .................... 707/3; 707/10; 707/104.1; 707/205; 709/203; 709/219

(58) Field of Classification Search ............... 707/3–5, 707/7, 10, 101, 102, 104.1, 205; 709/203, 709/219
See application file for complete search history.

(56) References Cited

U.S. PATENT DOCUMENTS

| | | | | |
|---|---|---|---|---|
| 6,057,842 A | * | 5/2000 | Knowlton et al. | 715/788 |
| 6,247,029 B1 | * | 6/2001 | Kelley et al. | 715/507 |
| 6,549,941 B1 | * | 4/2003 | Jaquith et al. | 709/219 |
| 6,711,569 B1 | * | 3/2004 | Bushee | 707/5 |
| 2003/0177111 A1 | * | 9/2003 | Egendorf et al. | 707/3 |
| 2004/0230566 A1 | * | 11/2004 | Balijepalli et al. | 707/3 |

* cited by examiner

Primary Examiner—Leslie Wong
(74) Attorney, Agent, or Firm—Patterson, Thuente, Skaar & Christensen, P.A.

(57) ABSTRACT

An automatic system and method for configuring to dynamic database search forms for facilitating the efficient submission of multiple queries to search engines. The system includes a computer system having storage for facilitating the retention of dynamic database content, a communications module for performing bi-directional communications with a network; a query input module for receiving a plurality of queries from a user and transferring the plurality of queries to a plurality of databases; an action string module for determining an appropriate data entry window for use in passing a query to the database; a results module for locating areas on a responsive page where results are placed; a next link module used to locate a link (URL) associated with additional results provided by the database; and an engine file module for storing results such that a general format query is translatable into a database specific dialects.

43 Claims, 5 Drawing Sheets

AUTOMATIC SYSTEM FOR CONFIGURING TO DYNAMIC DATABASE SEARCH FORMS

INCORPORATION BY REFERENCE

This patent application discloses an invention which may optionally form a portion of a larger system. Other portions of the larger system are disclosed and described in the following co-pending patent applications, all of which are subject to an obligation of assignment to the same person. The disclosures of these applications are herein incorporated by reference in their entireties.

SYSTEM FOR AUTOMATICALLY CATEGORIZING CONTENT IN HIERARCHICAL SUBJECT STRUCTURES, Thomas W. Tiahrt, Michael K. Bergman, and William J. Bushee, Filed Jul. 24, 2001, application Ser. No. 09/911,433.

BACKGROUND OF THE INVENTION

1. Field of the Invention

The present invention relates to network based forms and more particularly pertains to a new automatic system for configuring to dynamic database search forms for facilitate the efficient submission of multiple queries to search engines.

2. Description of the Prior Art

The Internet is a worldwide system of computer networks in which users at any one computer can get information located on any other computer (given permission). The Internet uses a set of protocols called Transmission Control Protocol/Internet Protocol or TCP/IP. The World Wide Web (often abbreviated as WWW) is a portion of the Internet using hypertext as a method for instant cross-referencing linking one document or site to another.

A database is a collection of data, which is organized in a manner that allows its contents to be easily accessed, managed, and updated. Given this definition an Internet site can be viewed as a database with a collection of data that can be viewed as pages, or accessible documents. Similarly, any network for accessing documents can be considered a database, including intranets and extranets. These network databases can be either static or dynamic. A static network database provides the same set of documents or pages to every user. A dynamic network database presents unique documents or pages in response to a user's query.

The use of search engines using network based forms to find relevant information on the Internet is known in the prior art. Search engines are able to match a multitude of documents to a user's query, but every search engine has a unique layout or form for collecting the users query. Additionally, some sites on the Internet allow additional databases to be searched when a query is applied to the specific form on the site that has been developed for searching the database associated with that particular site. The many variations possible between query form formats on Internet sites has made searching these various search engines and site databases en masse (or even just in large numbers) difficult if not virtually impossible to perform in an efficient manner. Conventional practice has often involved individually and manually configuring, or setting up, individual query formats suitable for use with queries submitted to each particular search engine or database. This manual configuration technique is in itself is a time consuming, tedious, and not always effective task when performed manually.

However, when one considers the many additional search engines and databases that may be added to the Internet on a daily basis, as well as those existing databases that may be newly discovered, it becomes apparent that this configuring task is an ongoing and never-ending chore that must be repeated for additional search engines and databases if one is to attempt to offer a user a truly in depth search of the ever expanding number of databases. The task of manually configuring search query formats thus hinders and may act as a considerable disincentive to offering a user the capability of searching a full range of the available search engines and databases, and so the user is presented with a less complete search of the Internet than the user may desire.

Therefore, while the prior art systems and techniques may fulfill their respective, particular objectives and requirements, the aforementioned systems and techniques do not disclose a new automatic system for configuring to dynamic database search forms.

SUMMARY OF THE INVENTION

In view of the foregoing disadvantages inherent in the known types of network based forms now present in the prior art, the present invention provides a new automatic system for configuring to dynamic database search forms construction wherein the same can be utilized for facilitate the efficient submission of multiple queries to a search engines.

The system of the invention includes a computer system having a storage means for facilitating the retention of dynamic database content, a communications means for performing bi-directional communications with a network; a query input means for receiving a plurality of queries from a user and transferring the plurality of queries to a plurality of databases; an action string module for determining an appropriate data entry window for use in passing a query to the database; a results module for locating areas on a responsive page where results are placed; a next link module used to locate a link (URL) associated with additional results provided by the database; and an engine file module for storing results such that a general format query is translatable into a database specific dialects.

The system of the invention generally permits the configuration of a user's query into a number of specific query formats each tailored to the particular requirements of a particular search engine or database. Significantly, the specific query formats are developed in a manner by the system of the invention that requires little, if any, manual or specific intervention by an operator in the development process of each of the specific query formats. The specific query formats may be stored and used for a multitude of user queries.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 5 therefore, a new automatic system and method for configuring to dynamic database search forms embodying the principles and concepts of the present invention will be determined.

As best illustrated in FIGS. 1 through 5, the automatic system for configuring to dynamic database search forms generally comprises a computer system 20, a query input means 26, and a plurality of function modules 40.

Figure 1:
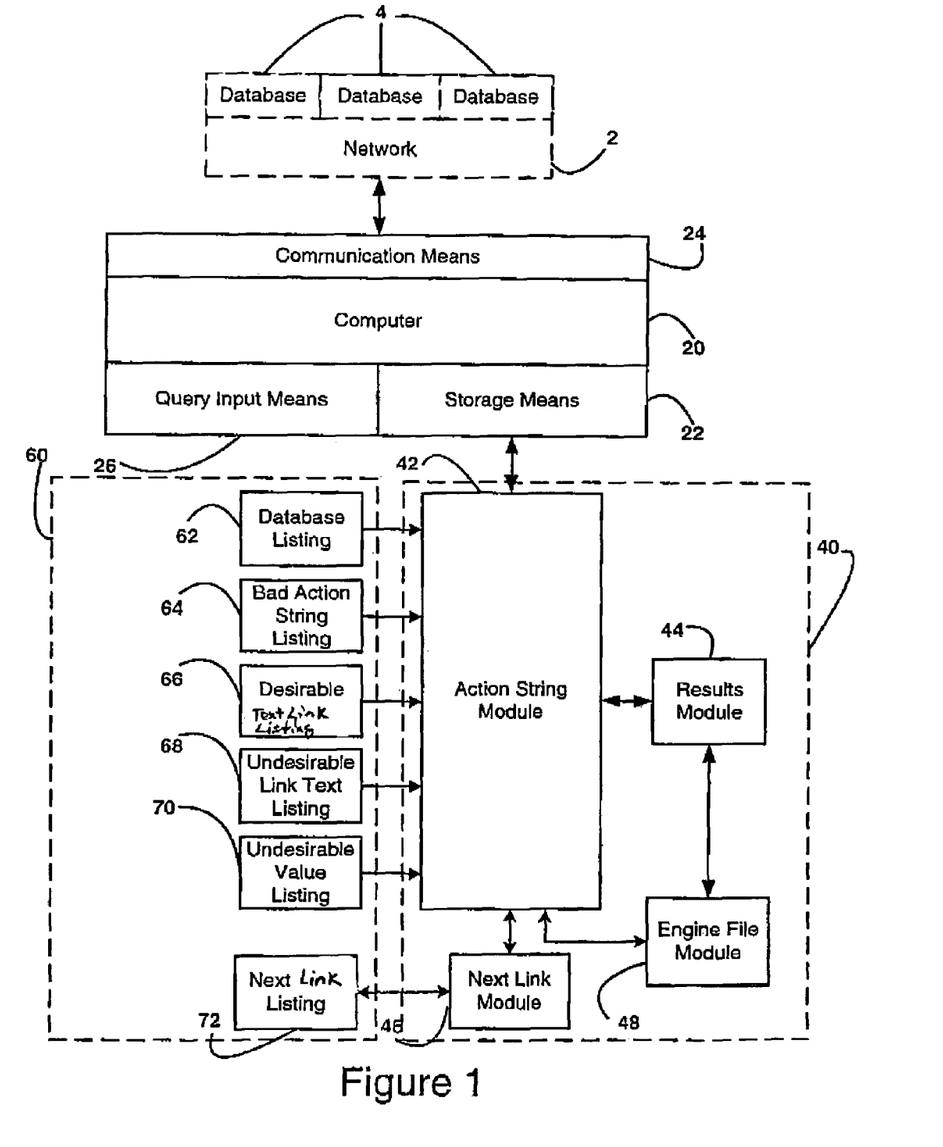
FIG. 1 is a schematic functional block diagram of a new automatic system and method for configuring to dynamic database search forms according to the present invention.

The computer system 20 includes a storage means 22 for facilitating the retention and recall of dynamic database content. The computer system 20 also includes a communications means 24 for performing bi-directional communications between the computer system 20 and a network.

The query input means 26 is for receiving a plurality of queries from a user and transferring the plurality of queries to a plurality of databases 4.

In one embodiment of the invention, the query input means 26 comprises an input module. The input module may comprise, for example, a keyboard, a mouse, a data input device capable of converting action of a user to a machine readable query, a data file transferred as one or more electrical signals to the computer system 20, a data file transferred as one or more optical signal to the computer system 20, a data file written to memory in the computer system 20, and a data file written to a storage medium accessible by the computer system 20.

The plurality of function modules 40 may include an action string module 42, a results module 44, a next link module 46, and an engine file module 48.

Figure 3:
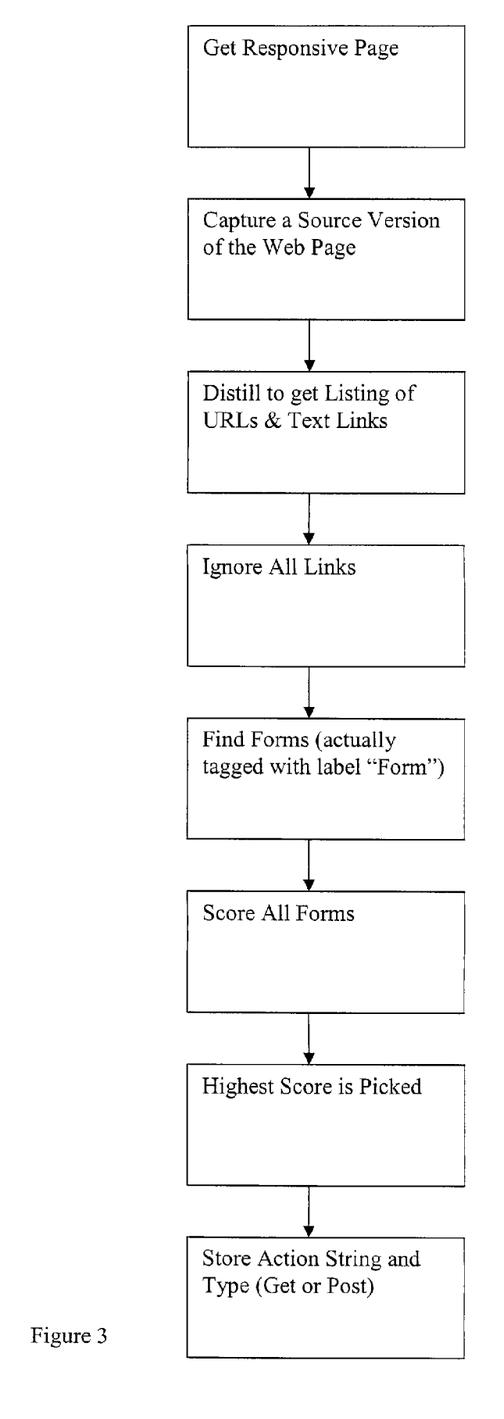
FIG. 3 is a schematic flow diagram of the action string module of the present invention.

The action string module 42 is interfaced with the computer system 20 for determining a format associated with an entry page for a database 4. The action string module 42 is used for determining an appropriate data entry window for use in passing a query to the database 4.

Figure 4:
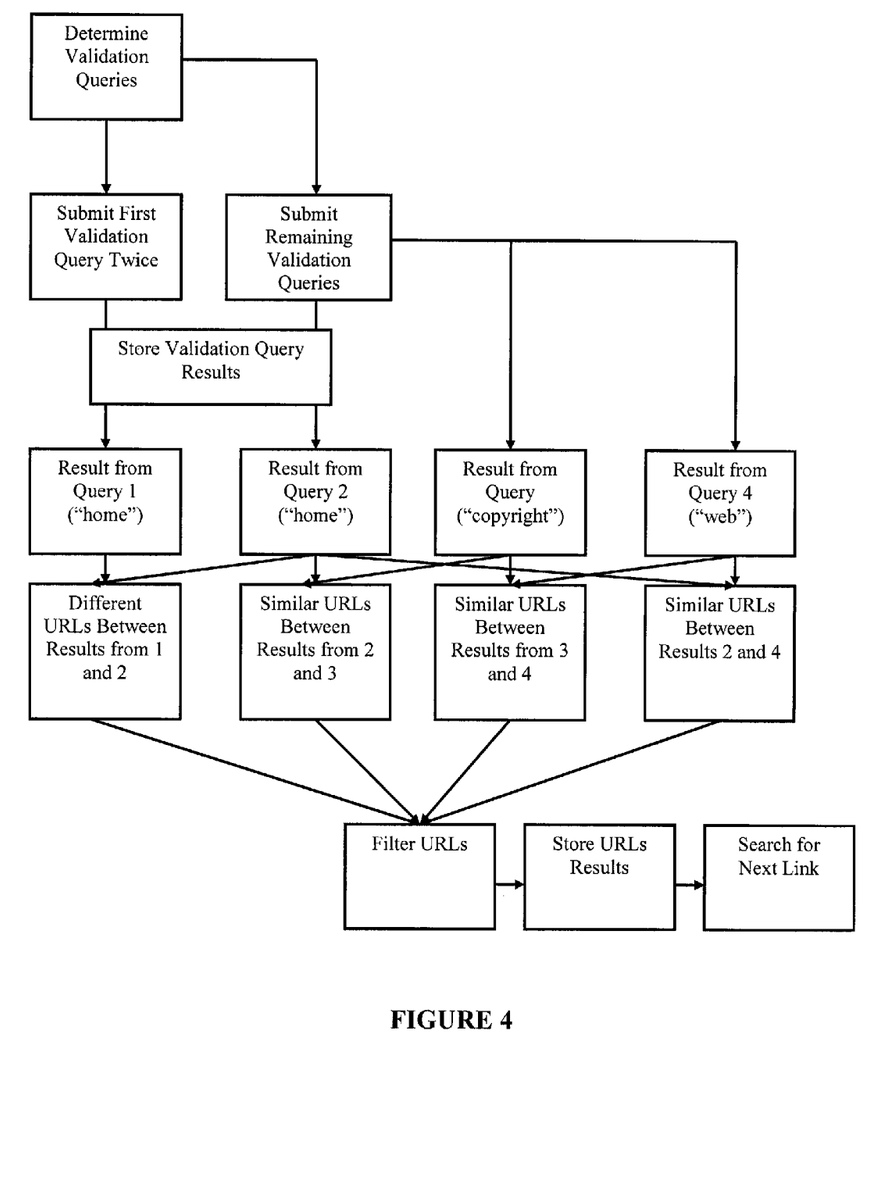
FIG. 4 is a schematic diagrammatic representation of the operation of the results module of the present invention.

The results module 44 is also interfaced with the computer system 20 and the action string module 42. The results module 44 locates areas on a responsive page returned by the database 4 in response to the submitted query where results are placed.

Figure 2:
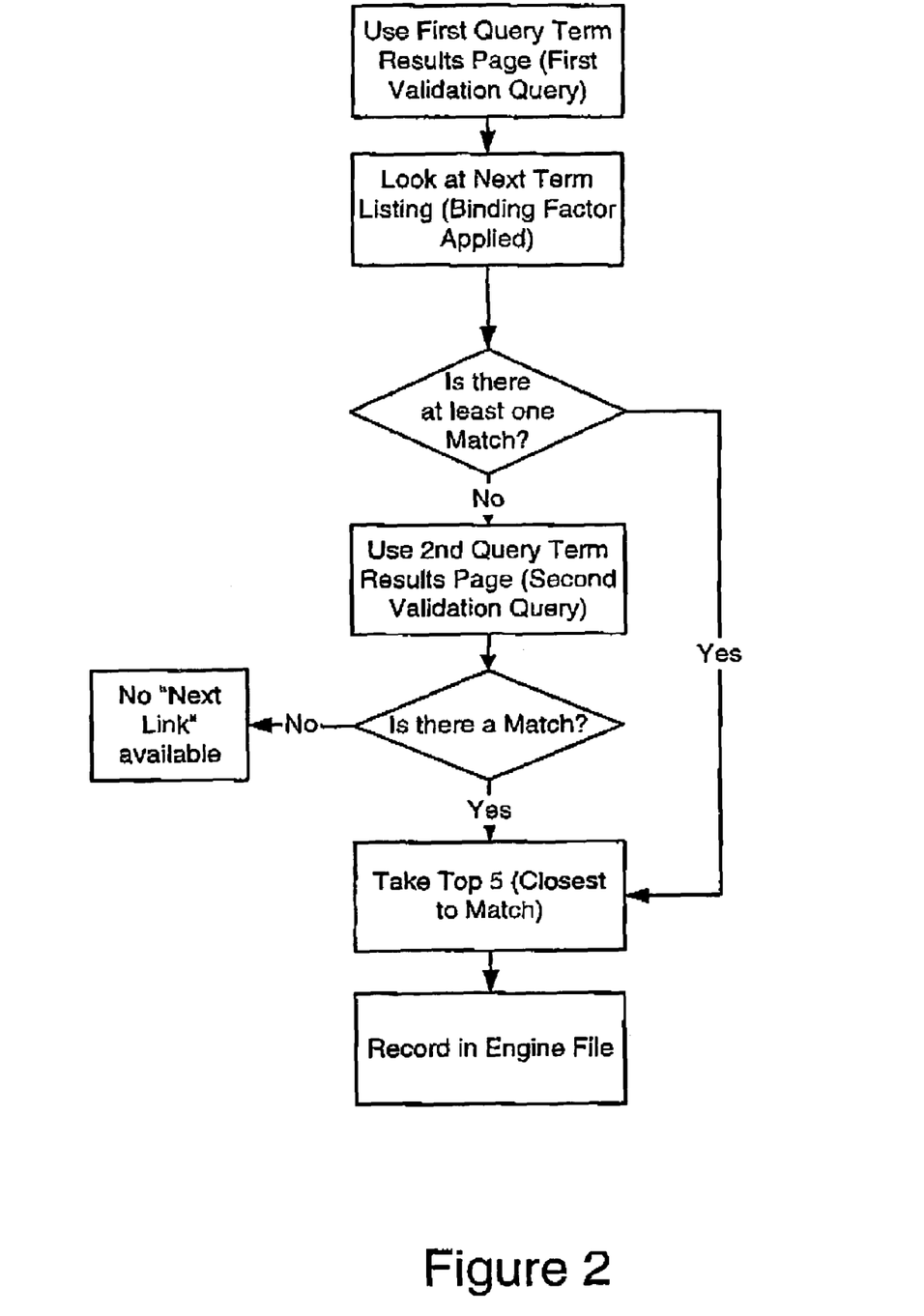
FIG. 2 is a schematic flow diagram of the next link module of the present invention.

Similarly, the next link module 46 is interfaced to the computer system 20, action string module 42, and results module 44. The next link module 46 locates a URL for a link associated with additional results provided by the database 4 in response to the query.

The engine file module 46 is also interfaced to the computer system 20 and every other module 42, 44, 46 for storing results produced by each module 42, 44, 46 such that a general format query is translatable into a database specific dialect (format) allowing a common query to be submitted to multiple databases 4 each requiring different formats.

A data comparison portion 60 provides user specific information to each of the modules 42,44,46,48 for facilitating analysis of the databases 4. The data comparison portion 60 may include a database listing 62, a bad action string listing 64, a desirable text listing 66, an undesirable text listing 68, an undesirable value listing 70, and a next term listing 72.

The database listing 62 provides a plurality of URLs, each associated with one of the databases 4 to be analyzed.

The bad action string listing 64 provides URLs for known databases (search engines) 4 which are not to be included in the analysis of said databases 4.

The desirable text link listing 66 provides a plurality of desirable terms for use in analysis of the databases 4. The presence of any one of the plurality of desirable terms increases a score associated with a data entry window (form) on one of the responsive pages.

The undesirable text link listing 68 provides a plurality of undesirable terms for use in analysis of the databases 4. The presence of any one of the plurality of undesirable terms sets a score associated with a data entry window (form) on one of the responsive pages to 0 and ends the analysis of the data entry window.

The undesirable value listing 70 provides a plurality of undesirable values for use in analysis of the databases 4. The presence of any one of the plurality of undesirable values decreases a score associated with a data entry window (form) on one of the responsive pages.

The next link listing 72 provides the next link module 46 with a plurality of candidate terms for facilitating selection of a URL associated with a link to additional responses provided by the database 4 in response to the user's query.

The automatic system for configuring query formats to dynamic database content performs a number of major functions, each of which has multiple sub-functions. The major functions include defining the format of a given database or web page, separating candidate results from all other information returned by the database or web page, finding the location of a link to additional search results (commonly referred to as a "next" button), and writing and verifying an output file specifying the format of the specific database or web page being configured.

Throughout each of its major functions of the system uses a soft matching technique to improve the probabilities of matching a data-entry window or form to a particular function by approximate term matching. A parameter called a binding factor is used to limit a range of length variations in matching terms. This soft matching technique allows a known term to be matched with similar terms of differing lengths.

An illustrative example of the soft matching technique may be found in the case where a web page is being examined to determine the location of the field on the web page where a request is made for retrieval of the next set of results from a previous search executed on the database of web site. In this illustrative case, the known term "next" may be matched against labels in a web page to find the field, but it is recognized that not all web pages will universally use the term "next" in association with the desired field, and some web pages may use alternate versions of the "next" term. "Next" is made up of four alphabetic characters. If a binding factor of 0 was used during the search, only labels of four characters could be considered. If a binding factor of 1 was used during the search, labels of at least 4 characters, but up to 50% more or 6 characters could be considered. Finally, if a binding factor of two was used during the search, labels of at least four characters but up to 100% more or eight characters could be considered. The following table describes multiple outcomes for different scenarios for this soft matching process.

| Label Being Compared to "Next" | B.F. = 0 (4 Characters) | B.F. = 1 (6 Characters) | B.F. = 2 (8 Characters) |
| --- | --- | --- | --- |
| NEXT | Match | Match | Match |
| NEXT O | Fail | Match | Match |
| NEXT ON | Fail | Fail | Match |
| NEXT ONE | Fail | Fail | Match |
| NEXT ONE H | Fail | Fail | Fail |
| A NEXT | Fail | Match | Match |
| NE | Fail | Fail | Fail |

The first major function of defining the format of a given database or web page initially begins with a URL being provided to the system for an entry page for the database or web page. The system follows the URL and captures the resulting page as a source version. The source version is filtered into a listing of other URLs and text. The text is examined to find forms on the page. These forms can be found in the source version of the entry page by locating each occurrence of the label "form". Each of the forms is scored to determine the most likely candidate for a data entry window for submitting a user's query to be searched, by the database or website. The form with the highest score is then selected as the data entry window for user's queries. If multiple forms have the same score, and that score is the highest score, then the form occurring first on the page is selected.

The database or web site is then tested to determine the most likely position in which results of a user's query will be returned. This information, along with the necessary action strings to drive the query data entry window and the location of items known to not be results, are stored in an engine file.

Figure 5:
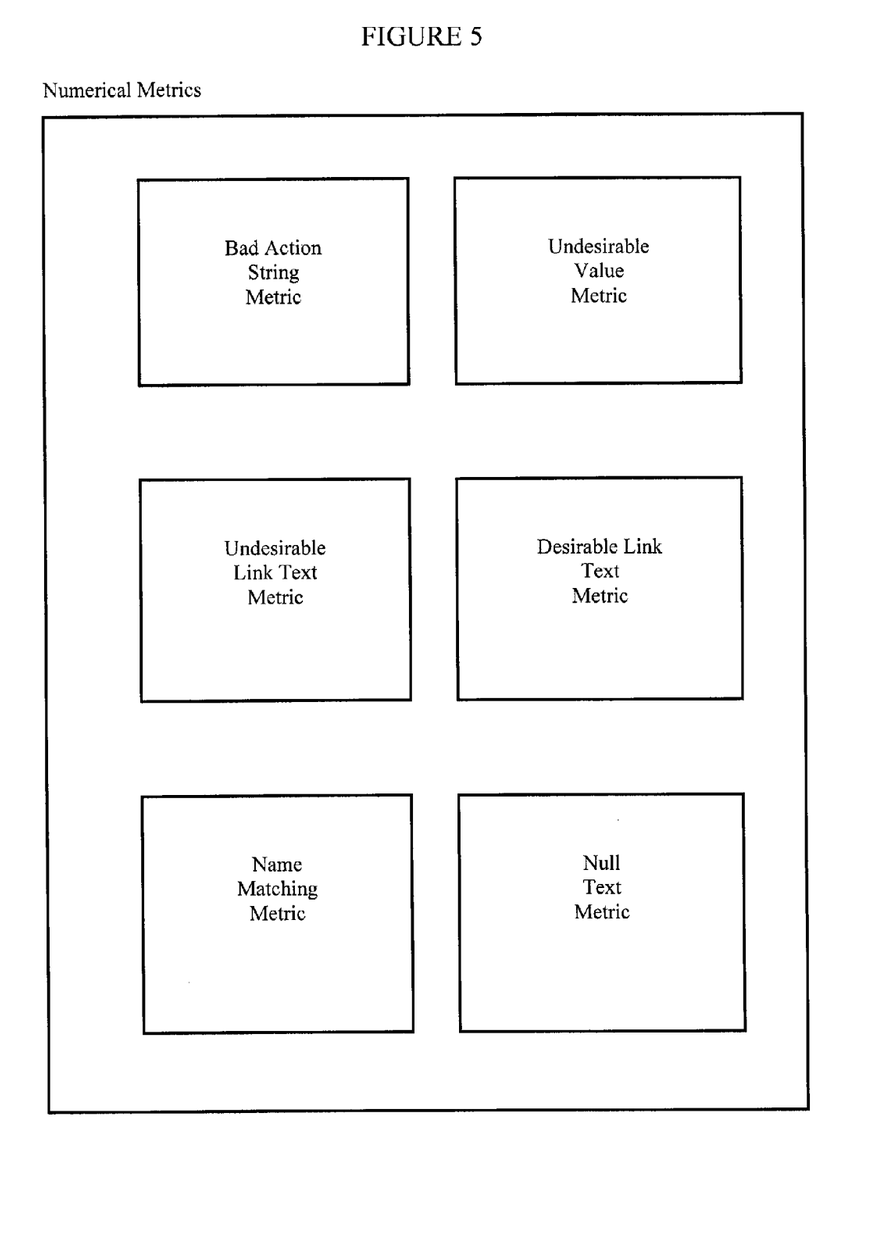
FIG. 5 illustrates a block diagram of numerical metrics according to the present invention.

The invention preferably uses a scoring methodology to develop a numerical representation of a likelihood that any particular data entry window or form is a proper window for submission of a user's query to the database being configured. The scoring methodology may look at available information to develop multiple numerical metrics used during the evaluation of each data entry window or form.

In general, the metrics are based on web page characteristics (such as text) that are associated with the data entry windows or forms. The numerical metrics may include a bad action string metric, an undesirable value metric, an undesirable link text metric, a desirable link text metric, a name matching metric, a null text metric, and an adjustment metric based upon the number of edit boxes.

In a preferred embodiment, the undesirable link text metric is determined by the presence of an undesirable label associated with the data entry window. These undesirable labels are generally of the type of labels that are associated with data entry windows that are unlikely to lead to suitable databases for the purposes of gathering information. These undesirable labels may preferably include: "email", "horoscope", "weather", "subscribe", "login", "vote", "quote", "update", "remove", "sign up", and "help". If any of these terms are present in the label associated with the data entry window then the scoring operation is halted, and the score for that particular data entry window is set to zero.

Similarly, in a preferred embodiment, the desirable link text metric is determined by the presence of a desirable label associated with the data entry window. These desirable labels are generally of the type of labels that are associated with data entry windows that are highly likely to lead to suitable databases for the purposes of gathering information. These desirable labels may preferably include: "search", "find", "locate", and "query".

Also in a preferred embodiment, the undesirable value metric is determined by the presence of an undesirable value associated with the data entry window. These undesirable labels preferably include: "password" and "zip".

The bad action string metric is a special case that allows elimination of links to known and commonly found search engines which may be found on web pages. If one of these known search engines is listed in the URL associated with the data entry window then the scoring operation is halted, and the score for that particular data entry window is set to zero. Illustrative examples of these known search engines may include, but are not limited to: AltaVista, Google, Amazon, and Yahoo.

The name matching metric is developed by comparing the URL associated with the data entry window with the URL associated with the page to verify that the host name matches on both URLs.

If no button text is associated with a data entry window or form, the scoring methodology sets the null text metric to a non-zero value to prevent the form from being unnecessarily discriminated against if the form is implemented as an image button (for example, an icon) with no text associated with the form.

In a preferred embodiment, multiple binding factors are used to facilitate soft matching of the text, values, URLs, and labels during the scoring operation. The scoring operation may use a binding factor of 0 associated with the bad action string metric, a binding factor of 1 associated with the undesirable link text metric, a binding factor of 2 associated with the desirable link text metric, and a binding factor of 0 associated with the undesirable values metric.

Also in a preferred embodiment, each one of the metrics may be assigned a unique integer value based on the validity of that particular metric. The magnitude of the integer value may be determined by the relative importance of the metric as compared to all other metrics. Illustratively, the scoring methodology may assign an integer value of 6 for any data entry window that has a URL host name that matches the host name of the web page; or an integer value of 0 for any data entry window which does not have a URL host name which matches the host name of the web page. The scoring methodology may also assign an integer value of 4 for any data entry window that has desirable link text; or an integer value of 0 for any data entry window that does not have desirable link text. Similarly, the scoring methodology may assign an integer value of 4 for any data entry window that does not have undesirable values; or an integer value of 0 for any data window that does have undesirable values. Finally, the scoring methodology may also assign an integer value of 2 for any data entry window that has no associated text.

A numeric score may be computed for each data entry window by adding the integer values associated with each of the metrics, such as the name match metric, the undesirable value metric, the desirable text metric, and the null text metric. The numeric score may then be adjusted by adding an integer value representing the number of data entry windows found versus the number of data entry windows expected. In a preferred embodiment, this adjustment may range from 3 to 0, inclusive.

The next major function of the system is finding the location of query results. This process is performed by selecting multiple validation queries to be submitted to the database using the data entry window selected by the previous major function (defining the format), submitting the validation queries and analyzing the responsive pages returned by the database in response to the validation queries.

In a preferred embodiment, the terms "home", "copyright", and "web" are used as validation queries. In a further preferred embodiment, three terms common to the subject area, with minimal overlap between any two terms, may be substituted as validation queries.

The first validation query is submitted twice and the responsive pages associated with each submittal are captured and analyzed. Any difference between these two pages indicates areas that are not used to return results associated with a query.

Additionally, one of the responsive pages associated with the first validation query is compared to both of the responsive pages associated with the second and third validation queries. Any commonalities between these responsive pages also indicate areas that are not used to return results associated with a query.

Finally, the responsive page associated with the second validation query and the responsive page associated with the third validation query are compared. Similarly, any commonalities between these responsive pages also indicate areas that are not used to return results associated with a query.

In each of these steps the comparison is done by examining URLs and text (labels) associated with the URLs. In a preferred embodiment, a value of 0.1 may be used as a binding factor associated with the text.

The third major function, finding the location of the "Next" link, builds upon the results of the last major function by using the results obtained in response to the validation queries. The text (labels) in the first responsive page is compared sequentially with a listing of candidate terms. A label matching the earliest term from the listing is selected as the "Next" link. If no matches are found, the responsive page captured in association with the second validation query is similarly analyzed. A binding factor may be used during the comparison of the text with the candidate terms. Preferably, the binding factor has a value ranging from 1 to 2 inclusive. Most preferably the binding factor has a value of 1.5.

In a preferred embodiment, the listing of candidate terms may include: "next", "next page", "[next page]", "next results", "next ", "next>>", "next hits", " next>>", ">>", ">>", ">", ">", "more results", "next 5", "next 10", "next 15", "next 20", "next 50", "next 100", "weiter", "display next", "get more search results", "more results", "page down", "arrow", "click here for more", "get the next", "go to", "more", "site matches". "more in this category", "search for more", "search for next", "show all", "show more results matching", "siguiente", "nächste", "siguiente pág", "próximos 10 regidtros", "10", "15", "20", "25", and "30".

The final major function of the system is storing the results in a file (such as a form method indicator) which may be used during a search process for automatically translating a query in a general format into each dialect (alternate format) required by each database or search engine.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method for the automatic configuration of dynamic database search forms comprising:
    obtaining a database listing containing the uniform resource locators (URLS) for each one of a plurality of databases to be configured;
    accessing each one of said plurality of databases;
    capturing a web page from each database of the plurality of databases associated with said URL;
    locating data entry windows in said captured web page;
    determining a probability score for each of the data entry windows, wherein each probability score represents a probability that a corresponding data entry window is associated with a query request mechanism;
    selecting a most probable data entry window from among the data entry windows for passing queries to said at least one database, wherein the selecting is based on the probability score;
    searching candidate responses for a next link indicating a next page for additional results from said at least one database in response to a query; and
    writing an engine file describing the form layout and requirements based upon said candidate responses and said next link.

2. The method of claim 1, wherein the step of accessing each one of said plurality of databases further comprises accessing a network and following a URL to a database on said network to be configured for automatic completion of search forms.

3. The method of claim 1, wherein the step of locating data entry windows in said captured web page further comprises:
    saving information captured from the web page as a source version of the web page;
    filtering said source version into additional listings of URLs and text portions;
    examining said text portions for occurrences of a form label;

collecting each form tagged with the form label;
scoring each one of said forms to develop a numerical representation of a likelihood that any one form is a query input form;
selecting one of said forms based on said form having a higher numerical representation than any other of said forms;
storing an action string associated with said form, said action string comprising a URL having at least a domain portion, a program portion, and a query portion;
storing a get-post indicator associated with said database.

4. The method of claim 3, wherein the step of scoring each one of said forms further comprises:
locating an action string associated with said data entry window;
obtaining a listing of bad action strings;
comparing said action string with said listing of bad action strings and determining if a portion of said action string matches any bad action string of said listing of bad action strings, setting said numerical representation to zero and terminating said step of scoring if said bad action string matches a portion of said action string within a predefined window determined by a binding factor;
wherein the step of setting said numerical representation further comprises using value of 0 for said binding factor associated with said bad action string metric;
locating a page URL associated with the web page;
comparing a host name portion of said data entry URL with a host name portion of said page URL;
setting a name matching metric to a presence predetermined value if said host name portion of said data entry URL matches said host name portion of said page URL;
setting a name matching metric to an absence predetermined value if said host name portion of said data entry URL does not match said host name portion of said page URL;
said steps of setting a name matching metric further comprises:
using a value of 6 for said presence value associated with said name matching metric;
using a value of 0 for said absence value associated with said name matching metric;
obtaining a listing of undesirable link texts;
comparing said action string with said listing of undesirable link text and determining if a portion of said action string matches any undesirable link texts of said listing of undesirable link texts, setting said numerical representation to zero and terminating said step of scoring if a portion of said action string matches any of said undesirable link texts within a predefined window determined by a binding factor;
using a value of 1 for said binding factor associated with said undesirable link text;
obtaining a listing of undesirable values;
comparing said action string with said listing of undesirable value and determining if a portion of said action string matches any undesirable values of said listing of undesirable values, setting an undesirable value metric to a presence predetermined value if a portion of said action string matches any of said undesirable values within a predefined window determined by a binding factor, and setting an undesirable value metric to an absence predetermined value if a portion of said action string does not match an undesirable value within a predefined window determined by a binding factor;
using a value of 0 for said presence predetermined value associated with said undesirable value metric;
using a value of 4 for said absence predetermined value associated with said undesirable value metric;
using a value of 0 for said binding factor associated with said undesirable value metric;
obtaining a listing of desirable link texts;
comparing said action string with said listing of desirable link text and determining if a portion of said action string matches any desirable link texts of said listing of desirable link texts, setting an desirable link text metric to a presence predetermined value if a portion of said action string matches any of said desirable link texts within a predefined window determined by a binding factor, and setting an desirable link text metric to an absence predetermined value if a portion of said action string does not match an desirable link text within a predefined window determined by a binding factor;
using a value of 4 for said presence predetermined value associated with said desirable text metric;
using a value of 0 for said absence predetermined value associated with said desirable text metric;
using a value of 2 for said binding factor associated with said desirable text metric;
checking said action string for an absence of associated text;
setting a null text metric to a presence predetermined value if no text is associated with said form;
using a value of 2 for said null text metric;
computing a numerical representation of the likelihood that said data entry is a correct data entry window for passing queries to said database; and
adjusting said numerical representation by adding an integer value determined by the number of edit boxes on said web page.

5. The method of claim 3, wherein the step of scoring each one of said forms further comprises:
locating an action string associated with said data entry window;
obtaining a listing of bad action string;
comparing said action string with said listing of bad action strings and determining if a bad action string matches a portion of said action string;
setting said numerical representation to zero and terminating said step of scoring if said bad action string matches a portion of said action string within a predefined window determined by a binding factor;
using a value of 0 for said binding factor associated with said bad action string metric;
locating said data entry URL associated with the data entry window;
locating a page URL associated with the web page;
comparing a host name portion of said data entry URL with a host name portion of said page URL;
setting a name matching metric to a presence predetermined value if said host name portion of said data entry URL matches said host name portion of said page URL;
setting a name matching metric to an absence predetermined value if said host name portion of said data entry URL does not match said host name portion of said page URL;
using a value of 0 for said absence predetermined value associated with said name matching metric;
obtaining a listing of undesirable link texts;
comparing said action string with said listing of undesirable link text and determining if a portion of said action string matches any undesirable link tests of said listing of undesirable link texts; setting said numerical representation to zero and terminating said step of scoring if a portion of said action string matches any of said undesirable link tests within a predefined window determined by a binding factor;

using a value of 1 for said binding factor associated with said undesirable link text;

obtaining a listing of undesirable values;

comparing said action string with said listing of undesirable value and determining if a portion of said action string matches any undesirable values of said listing of undesirable values, setting an undesirable value metric to a presence predetermined value if a portion of said action string matches any of said undesirable values within a predefined window determined by a binding factor, and setting an undesirable value metric to an absence predetermined value if a portion of said action string does not match an undesirable value within a predefined window determined by a binding factor;

using a value of 0 for said presence value associated with said undesirable value metric;

using a value of 0 for said binding factor associated with said undesirable value metric;

obtaining a listing of desirable link texts;

comparing said action string with said listing of desirable link text and determining if a portion of said action string matches any desirable link texts of said listing of desirable link texts, setting an desirable link text metric to a presence predetermined value if a portion of said action string matches any of said desirable link texts within a predefined window determined by a binding factor, and setting an desirable link text metric to an absence predetermined value if a portion of said action string does not match an desirable link text within a predefined window determined by a binding factor;

using a value of 0 for said absence predetermined value associated with said desirable text metric;

using a value of 2 for said binding factor associated with said desirable text metric;

checking said action string for an absence of associated text;

setting a null text metric to a presence predetermined value if no text is associated with said form;

using values for said presence predetermined value associated with said name matching metric, said absence predetermined value associated with said undesirable value metric, said presence predetermined value associated with said desirable text metric, and said null text metric such that a relative weighting of each of said metrics is approximately 3:2:2:1 respectively; and computing a said numerical representation.

6. The method of claim 1, further comprising:

determining a location of each one of a plurality of results locations on a responsive web page where results from a query are posted;

determining a location of each one of a plurality of non-results items on a responsive page are posted.

7. The method of claim 1, wherein the step of capturing the web page includes including storing substantially all portions of the web page.

8. The method of claim 1, wherein the step of capturing the web page includes storing text portions of the web page associated with any said data entry windows of the web page.

9. A method for the automatic configuration of dynamic database search forms comprising:

obtaining a database listing containing the uniform resource locators (URLS) for each one of a plurality of databases to be configured;

accessing each one of said plurality of databases;

capturing a web page from each database of the plurality of databases associated with said URL;

locating data entry windows in said captured web page;

determining a probability score for each of the data entry windows, wherein each probability score represents a probability that a corresponding data entry window is associated with a query request mechanism;

selecting a most probable data entry window from among the data entry windows for passing queries to said at least one database, wherein the selecting is based on the probability score;

searching candidate responses for a next link indicating a next page for additional results from said at least one database in response to a query; and writing an engine file describing the form layout and requirements based upon said candidate responses and said next link;

wherein the step of locating data entry windows in said captured webpage comprises:

saving information captured from the web page as a source version of the web page;

filtering said source version into additional listings of URLs and text portions;

examining said text portions for occurrences of a form label;

collecting each form tagged with the form label;

wherein the step of determining a probability score comprises:

scoring each one of said forms to develop a numerical representation of a likelihood that any one form is a query input form;

wherein the step of selecting a most probable data entry window from among the data entry windows comprises:

selecting one of said forms based on said form having a higher numerical representation than any other of said forms;

storing an action string associated with said form, said action string comprising a URL having at least a domain portion, a program portion, and a query portion;

storing a get-post indicator associated with said database;

wherein the step of scoring each one of said forms further comprises:

locating an action string associated with said data entry window;

obtaining a listing of bad action string;

comparing said action string with said listing of bad action strings and determining if a portion of said action string matches any bad action strings of said listing of bad action strings, setting said numerical representation to zero and terminating said step of scoring if a portion of said action string matches any of said bad action strings within a predefined window determined by a binding factor;

setting at least one metric selected from the group consisting of:

a name matching metric;

an undesirable link test metric;

an undesirable value metric;

a desirable link text metric; and a null text metric; and computing a said numerical representation.

10. The method of claim 9, wherein the step of setting said numerical representation further comprises using value of 0 for said binding factor associated with said bad action string metric.

11. The method of claim 10, wherein the step of setting a desirable link text metric further comprises:
   locating said action string associated with said data entry window;
   obtaining a listing of desirable link texts;
   comparing said action string with said listing of desirable link text and determining if a portion of said action string matches any desirable link texts of said listing of desirable link texts, setting an desirable link text metric to a presence predetermined value if a portion of said action string matches any of said desirable link texts within a predefined window determined by a binding factor, and setting an desirable link text metric to an absence predetermined value if a portion of said action string does not match an desirable link text within a predefined window determined by a binding factor.

12. The method of claim 11, further comprising:
   using a value of 4 for said presence predetermined value associated with said desirable text metric;
   using a value of 0 for said absence predetermined value associated with said desirable text metric;
   using a value of 2 for said binding factor associated with said desirable text metric.

13. The method of claim 10, wherein the step of setting an undesirable value metric further comprises:
   locating said action string associated with said data entry window;
   obtaining a listing of undesirable values;
   comparing said action string with said listing of undesirable value and determining if a portion of said action string matches any undesirable values of said listing of undesirable values, setting an undesirable value metric to a presence predetermined value if a portion of said action string matches any of said undesirable values within a predefined window determined by a binding factor, and setting an undesirable value metric to an absence predetermined value if a portion of said action string does not match an undesirable value within a predefined window determined by a binding factor.

14. The method of claim 13, further comprising:
   using a value of 0 for said presence predetermined value associated with said undesirable value metric;
   using a value of 4 for said absence predetermined value associated with said undesirable value metric;
   using a value of 0 for said binding factor associated with said undesirable value metric.

15. The method of claim 9, wherein the step of setting a name matching metric further comprises:
   locating said data entry URL associated with the data entry window;
   locating a page URL associated with the web page;
   comparing a host name portion of said data entry URL with a host name portion of said page URL;
   setting a name matching metric to a presence predetermined value if said host name portion of said data entry URL matches said host name portion of said page URL;
   setting a name matching metric to an absence predetermined value if said host name portion of said data entry URL does not match said host name portion of said page URL.

16. The method of claim 15, wherein said steps of setting a name matching metric further comprise:

using a value of 6 for said presence predetermined value associated with said name matching metric;
using a value of 0 for said absence predetermined value associated with said name matching metric.

17. The method of claim 9, wherein the step of setting an undesirable link text metric further comprises:
   locating said action string associated with said data entry window;
   obtaining a listing of undesirable link texts;
   comparing said action string with said listing of undesirable link text and determining if a portion of said action string matches any undesirable link texts of said listing of undesirable link texts, setting said numerical representation to zero and terminating said step of scoring if a portion of said action string matches any of said undesirable link texts within a predefined window determined by a binding factor.

18. The method of claim 17, wherein said steps of setting an undesirable link metric further comprises using a value of 1 for said binding factor associated with said undesirable link text.

19. The method of claim 9, wherein the step of setting a null text metric further comprises:
   locating said action string associated with said data entry window;
   checking said action string for an absence of associated text;
   setting a null text metric to a presence predetermined value if no text is associated with said form.

20. The method of claim 19, wherein said step of setting a null text metric further comprises using a value of 2 for said null text metric.

21. The method of claim 9, wherein said step of calculating said numerical representation further comprises adjusting said numerical representation by adding an integer value determined by the number of edit boxes on said web page.

22. A method for the automatic configuration of dynamic database search forms comprising:
   obtaining a database listing containing the uniform resource locators (URLs) for each one of a plurality of databases to be configured;
   accessing each one of said plurality of databases;
   capturing a web page from the database associated with said URL;
   locating data entry windows in said captured web page;
   selecting a most probable data entry window of data entry windows in said captured web page based on a probability score of each data entry window for passing queries to said database;
   searching candidate responses for a next link indicating a next page for additional results from said database in response to a query; and
   writing an engine file describing the form layout and requirements based upon said candidate responses and said next link;
   determining a location of each one of a plurality of results or non result item_locations on a responsive web page where results from a query are posted;
   selecting a plurality of validation queries;
   submitting a first one of said plurality of validation queries to said database using said action string;
   capturing a first responsive web page returned in response to said first one of said plurality of validation queries;
   resubmitting said first one of said plurality of validation queries to said database using said action string;

capturing a second responsive web page returned in response to said second submission of said first one of said plurality of validation queries;

comparing said first responsive web page with said second responsive web page, any differences between said first and second responsive web page, any differences between said first and second responsive web page are extraneous responses and are ignored, storing any duplicates between said first and second responsive web pages as candidate responses to said validation query;

storing said candidate responses;

submitting a second one of said plurality of validation queries to said database using said action string;

capturing a responsive web page returned in response to said second validation query;

repeating submission of additional validation queries and capture of additional responsive web pages until all validation queries have been submitted;

comparing said first responsive web page to each of said additional responsive web pages, ignoring any duplicates between said first responsive and additional responsive web pages as extraneous responses, storing any differences between said first responsive and said additional responsive web pages as candidate responses to said validation query;

comparing each one of said responsive web pages to all other said responsive web pages, ignoring any duplicates between said responsive web pages as extraneous responses, storing any differences between said responsive web pages as candidate responses to said validation query; and searching candidate responses for a next link indicating a next page for additional results from said database in response to said query.

23. The method of claim 22, wherein said step of comparing said first responsive web page with said second responsive web page further comprises:

comparing each URL in said first responsive web page with each URL in said second responsive web page;

capturing a location associated with every URL common between said first responsive web page and said second responsive web page as a potential location for results from a query;

capturing a location associated with every URL distinct between said first responsive web page and said second responsive web page as a potential location not associated with results from a query;

comparing each label associated with each URL in said first responsive web page with each label associated with each URL in said second responsive web page;

capturing a location, associated with every label associated with every URL, which is common between said first responsive web page and said second responsive web page as a potential location for results from a query;

capturing a location, associated with every label associated with every URL, which is distinct between said first responsive web page and said second responsive web page as a potential location not associated with results from a query.

24. The method of claim 22, wherein said step of comparing said first responsive web page with said additional responsive web page further comprises:

comparing each URL in said first responsive web page with each URL in said additional responsive web page;

capturing a location associated with every URL common between said first responsive web page and said additional responsive web page as a potential location for results from a query;

capturing a location associated with every URL distinct between said first responsive web page and said additional responsive web page as a potential location not associated with results from a query;

comparing each label associated with each URL in said first responsive web page with each label associated with each URL in said additional responsive web page;

capturing a location, associated with every label associated with every URL, which is common between said first responsive web page and said additional responsive web page as a potential location for results from a query;

capturing a location, associated with every label associated with every URL, which is distinct between said first responsive web page and said additional responsive web page as a potential location not associated with results from a query.

25. The method of claim 22, wherein said step of comparing each one of said responsive web pages with all other said responsive web pages further comprises:

comparing each URL in each one of said responsive web pages with each URL in all other said responsive web pages;

capturing a location associated with every URL common between each one of said responsive web pages and all other said responsive web pages as a potential location for results from a query;

capturing a location associated with every URL distinct between each one of said responsive web pages and all other said responsive web pages as a potential location not associated with results from a query;

comparing each label associated with each URL in each one of said responsive web pages with each label associated with each URL in all other said responsive web pages;

capturing a location, associated with every label associated with every URL, which is common between each one of said responsive web pages and all other said responsive web pages as a potential location for results from a query;

capturing a location, associated with every label associated with every URL, which is distinct between each one of said responsive web pages and all other said responsive web pages as a potential location not associated with results from a query.

26. The method of claim 22, further comprising:

comparing each URL in said first responsive web page with each URL in said second responsive web page;

capturing a location associated with every URL common between said first responsive web page and said second responsive web page as a potential location for results from a query;

capturing a location associated with every URL distinct between said first responsive web page and said second responsive web page as a potential location not associated with results from a query;

comparing each label associated with each URL in said first responsive web page with each label associated with each URL in said second responsive web page;

capturing a location, associated with every label associated with every URL, which is common between said first responsive web page and said second responsive web page as a potential location for results from a query;

capturing a location, associated with every label associated with every URL, which is distinct between said first responsive web page and said second responsive web page as a potential location not associated with results from a query;

comparing each URL in said first responsive web page with each URL in said additional responsive web page;

capturing a location associated with every URL common between said first responsive web page and said additional responsive web page as a potential location for results from a query;

capturing a location associated with every URL distinct between said first responsive web page and said additional responsive web page as a potential located not associated with results from a query;

comparing each label associated with each URL in said first responsive web page with each label associated with each URL in said additional responsive web page;

capturing a location, associated with every label associated with every URL, which is common between said first responsive web page and said additional responsive web page as a potential location for results from a query;

capturing a location, associated with every label associated with every URL, which is distinct between said first responsive web page and said additional responsive web page as a potential location not associated with results from a query;

comparing each URL in each one of said responsive web pages with each URL in all other said responsive web pages;

capturing a location associated with every URL common between each one of said responsive web pages and all other responsive web pages as a potential location for results from a query;

capturing a location associated with every URL distinct between each one of said responsive web pages and all other said responsive web pages as a potential location not associated with results from a query;

comparing each label associated with each URL in each one of said responsive web pages with each label associated with each URL in all other said responsive web pages;

capturing a location, associated with every label associated with every URL, which is common between each one of said responsive web pages and all other said responsive web pages as a potential location for results from a query;

capturing a location, associated with every label associated with every URL, which is distinct between each one of said responsive web pages and all other responsive web pages as a potential location not associated with results from a query.

27. The method of claim 22, wherein said step of selecting a plurality of validated queries further comprises:
selecting the term "home" as a first one of said plurality of validation queries;
selecting the term "copyright" as a second one of said plurality of validation queries;
selecting the term "web" as a third one of said plurality of validation queries.

28. The method of claim 22, wherein said step of selecting a plurality of validation queries further comprises:
selecting the term "home" as a first one of said plurality of validation queries;
selecting the term "energy" as a second one of said plurality of validation queries;
selecting the term "electricity" as a third one of said plurality of validation queries.

29. The method of claim 22, wherein said step of searching candidate responses for a next link further comprises:
obtaining a next term listing providing a plurality of labels commonly associated with data entry windows used for accessing additional results from a database associated with a user's query;
comparing each label associated with each URL in said first responsive web page with each one of said plurality of labels in order provided in said next term listing;
selecting a data entry window as a next link if said label associated with said data entry window matches one of said plurality of labels provided by said next link listing within a predetermined window defined by a binding factor.

30. The method of claim 29, wherein said step of selecting a data entry window further comprises;
determining if a match has been made between said label associated with said data entry window and one of said plurality of labels provided by said next link listing;
comparing each label associated with each URL in a first one of said additional responsive web pages associated with a second one of said validation queries with each one of said plurality of labels in order provided in said next term listing in no match has been made;
selecting a data entry window as a next link if said label associated with said data entry window matches one of said plurality of labels provided by said next link listing within a predetermined window defined by a binding factor if no prior match has been made.

31. The method of claim 29, wherein said step of selecting a data entry window further comprises using a value of approximately 1.5 for said binding factor.

32. A system for the automatic configuration of dynamic database search forms comprising:
a computer system having a storage means for facilitating the retention and recall of dynamic database content, said computer system having a communications means for performing bi-directional communications between said computer system and a network;
a query input means for receiving a plurality of queries from a user and transferring the plurality of queries to a plurality of databases;
an action string module interfaced to said computer system and configured to automatically determine a format associated with an entry page for a database from said entry page, said action string module being configured to automatically determine an appropriate data entry window on said entry page for use in passing a query to said database;
a results module interfaced to said computer system and said action string module, said results module locating areas on a responsive page returned by said database in response to said query where results are placed;
a next link module interface to each one of said computer system, action string module, and results module, said next link module locating a link associated with additional results provided by said database in response to said query;
an engine file module interfaced to said computer system and said modules for storing results produced by each module such that a general format query is translatable into a database specific format allowing a common query to be submitted to multiple databases each requiring different formats.

33. The system of claim 32, further comprising a data comparison portion providing user specific information to each of said modules for facilitating analysis of said databases.

34. The system of claim 33, wherein said data comparison portion further comprises:
a next link listing providing said next link module with a plurality of candidate terms for facilitating selection of a URL associated with a link to additional responses provided by said database in response to said query.

35. A system for the automatic configuration of dynamic database search forms comprising:
a computer system having a storage means for facilitating the retention and recall of dynamic database content, said computer system having a communications means for performing bi-directional communications between said computer system and a network;
a query input means for receiving a plurality of queries from a user and transferring the plurality of queries to a plurality of databases;
an action string module interfaced to said computer system for determining a format associated with an entry page for a database, said action string module being for determining an appropriate data entry window for use in passing a query to said database;
a results module interfaced to said computer system and said action string module, said results module locating areas on a responsive page returned by said database in response to said query where results are placed;
a next link module interface to each one of said computer system, action string module, and results module, said next link module locating a link associated with additional results provided by said database in response to said query;
an engine file module interfaced to said computer system and every other module for storing results produced by each module such that a general format query is translatable into a database specific format allowing a common query to be submitted to multiple databases each requiring different formats;
a data comparison portion providing user specific information to each of said modules for facilitating analysis of said databases;
wherein said data comparison portion further comprises:
a database listing providing a URL for each of said databases to be analyzed;
a bad action string listing providing URLs for known databases which are not to be included in the analysis of said databases;
a desirable text link listing providing a plurality of desirable terms for use in analysis of said databases, a presence of any one of said plurality of desirable terms increasing a score associated with a data entry window on one of said responsive pages;
an undesirable text link listing providing a plurality of undesirable terms for use in analysis of said databases, a presence of any one of said plurality of undesirable terms setting a score associated with a data entry window on one of said responsive pages to 0 and ending analysis of said data entry window; and
an undesirable value listing providing a plurality of undesirable values for use in analysis of said databases, a presence of any one of said plurality of undesirable values decreases a score associated with a data entry window on one of said responsive pages.

36. A system for the automatic configuration of dynamic database search forms comprising:
a computer system having a storage means for facilitating the retention and recall of dynamic database content, said computer system having a communications means for performing bi-directional communications between said computer system and a network;
a query input means for receiving a plurality of queries from a user and transferring the plurality of queries to a plurality of databases;
an action string module interfaced to said computer system for determining a format associated with an entry page for a database, said action string module being for determining an appropriate data entry window for use in passing a query to said database;
a results module interfaced to said computer system and said action string module, said results module locating areas on a responsive page returned by said database in response to said query where results are placed;
a next link module interface to each one of said computer system, action string module, and results module, said next link module locating a link associated with additional results provided by said database in response to said query;
an engine file module interfaced to said computer system and every other module for storing results produced by each module such that a general format query is translatable into a database specific format allowing a common query to be submitted to multiple databases each requiring different formats;
a database listing providing a URL for each of said databases to be analyzed;
a bad action string listing providing URLs for known databases which are not to be included in the analysis of said databases;
a desirable text link listing providing a plurality of desirable terms for use in analysis of said databases, a presence of any one of said plurality of desirable terms increases a score associated with a data entry window on one of said responsive pages;
an undesirable text link listing providing a plurality of undesirable terms for use in analysis of said databases, a presence of any one of said plurality of undesirable terms sets a score associated with a data entry window on one of said responsive pages to 0 and ending analysis of said data entry window; and
an undesirable value listing providing a plurality of undesirable values for use in analysis of said databases, a presence of any one of said plurality of undesirable values decreases a score associated with a data entry window on one of said responsive pages;
a next link listing providing said next link module with a plurality of candidate terms for facilitating selection of a URL associated with a link to additional responses provided by said database in response to said query.

37. A method for automatic configuration of dynamic search forms for a database, said method comprising:
accessing a web page from a web site providing access to the database;
capturing said web page;
locating a plurality of data entry windows in said captured web page;

determining a probability for each data entry window the data entry window is associated with a query request mechanism;

selecting, based on the probability that a data entry window is associated with a query request mechanism, a most probable data entry window from among the data entry windows for passing queries to said at least one database;

storing an identification of said most probable data entry window in association with an identification of said database for use in submitting queries to said database.

38. The method of claim 37, wherein said step of determining said most probable data entry window includes:

submitting at least one query to said database using said most probable data entry window; and evaluating responses from said web site to said at least one query for determining a likelihood that said most probable data entry window is a proper window for searching said database.

39. The method of claim 37, further comprising:

searching candidate responses from said web site for a link indicating a next page for additional results from said database in response to a query; and storing an identification of said link indicating a next page for additional results.

40. The method of claim 37, wherein the step of capturing said web page further comprises:

saving information captured from the web page as a source version of the web page.

41. The method of claim 40, wherein the step of locating said at least one data entry window further comprises;

filtering said source version into listings of links and text portions;

examining said text portions for occurrences of a form label; and collecting each form tagged with the form label.

42. The method of claim 41, wherein the step of determining said most probable data entry window further comprises;

scoring each one of said forms to develop a numerical representation of a likelihood that any one form is a query input form; and selecting one of said forms based on said form having a higher numerical representation than any other of said forms.

43. The method of claim 42, wherein the step of storing an identification of said most probable data entry window further comprises;

storing an action string associated with said form, said action string comprising a representation of a uniform resource locator (URL) link having at least a domain portion, a program portion, and a query portion.

* * * * *